(12) United States Patent
Kim et al.

(10) Patent No.: US 12,384,338 B2
(45) Date of Patent: Aug. 12, 2025

(54) AGRICULTURAL WORK VEHICLE

(71) Applicant: LS MTRON LTD., Anyang-si (KR)

(72) Inventors: Yongrae Kim, Anyang-si (KR); Jihun Yu, Anyang-si (KR); Okshik Shin, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 106 days.

(21) Appl. No.: 18/420,368

(22) Filed: Jan. 23, 2024

(65) Prior Publication Data
US 2024/0198983 A1    Jun. 20, 2024

Related U.S. Application Data

(63) Continuation of application No. PCT/KR2022/012260, filed on Aug. 17, 2022.

(30) Foreign Application Priority Data

Aug. 17, 2021  (KR) .......................... 10-2021-0107954
Aug. 16, 2022  (KR) .......................... 10-2022-0101895

(51) Int. Cl.
*B60T 8/00*       (2006.01)
*B60K 26/02*     (2006.01)
(Continued)

(52) U.S. Cl.
CPC ............ *B60T 8/1701* (2013.01); *B60K 26/02* (2013.01); *B60T 8/171* (2013.01); *B60T 8/172* (2013.01);
(Continued)

(58) Field of Classification Search
CPC ........ B60T 8/1701; B60T 8/171; B60T 8/172; B60T 2220/04; B60T 2260/09;
(Continued)

(56) References Cited

U.S. PATENT DOCUMENTS

| 2006/0150624 A1* | 7/2006 | Shah ..................... F16H 61/431 60/445 |
| 2013/0116895 A1* | 5/2013 | Smith ..................... F16H 61/70 701/50 |
| 2021/0396308 A1* | 12/2021 | Yu ........................... F16H 59/68 |

FOREIGN PATENT DOCUMENTS

| JP | H09039769 A | 2/1997 |
| JP | 2001180315 A | 7/2001 |

(Continued)

OTHER PUBLICATIONS

International Search Report for related International Application No. PCT/KR2022/012260; action dated Feb. 23, 2023; (2 pages).

(Continued)

*Primary Examiner* — Shardul D Patel
(74) *Attorney, Agent, or Firm* — K&L Gates LLP

(57) ABSTRACT

The present disclosure is directed to an agricultural work vehicle including: a vehicle body configured to support an engine; a transmission configured to perform shifting on drive generated by the engine; a braking unit implemented as a hydraulic brake or a mechanical brake, and configured to reduce the travelling speed of the vehicle body and control the deceleration of each of left and right wheels; an operation unit provided in the vehicle body; and a control unit configured to control the transmission and the braking unit; wherein the control unit includes a conjunctive operation module configured to control the braking unit and the forward-reverse clutch so that both the braking rate at which the braking unit reduces the travelling speed of the vehicle body and the drive transmission rate at which the forward-reverse clutch transmits drive are adjusted.

12 Claims, 5 Drawing Sheets

(51) Int. Cl.
  *B60T 8/17* (2006.01)
  *B60T 8/171* (2006.01)
  *B60T 8/172* (2006.01)
  *F16H 59/10* (2006.01)
  *A01B 76/00* (2006.01)
  *F16H 59/02* (2006.01)

(52) U.S. Cl.
  CPC .............. *F16H 59/10* (2013.01); *A01B 76/00* (2013.01); *B60T 2220/04* (2013.01); *B60T 2260/09* (2013.01); *F16H 2059/0256* (2013.01)

(58) Field of Classification Search
  CPC .......... B60T 2260/04; B60T 7/12; B60T 7/04; B60T 11/21; B60T 8/00; B60K 26/02; F16H 59/10; F16H 2059/0256; A01B 76/00; A01D 41/1274; A01D 69/10; A01D 69/08
  USPC ........................................................... 701/50
  See application file for complete search history.

(56) References Cited

FOREIGN PATENT DOCUMENTS

| | | |
|---|---|---|
| JP | 2003172379 A | 6/2003 |
| JP | 2008281133 A | 11/2008 |
| JP | 2015105701 A | 6/2015 |
| JP | 2015166635 A | 9/2015 |
| JP | 2015175445 A | 10/2015 |
| JP | 2016200203 A | 12/2016 |
| JP | 2020098007 A | 6/2020 |
| WO | 2018037935 A1 | 3/2018 |

OTHER PUBLICATIONS

Written Opinion for related International Application No. PCT/KR2022/012260; action dated Feb. 23, 2023; (4 pages).
Office Action for related Japanese Application No. 2024-502700; action dated Nov. 26, 2024; (7 pages).

\* cited by examiner

AGRICULTURAL WORK VEHICLE

CROSS-REFERENCE TO RELATED APPLICATION

This application is a Continuation application of International Application No. PCT/KR2022/012260 filed on Aug. 17, 2022, which claims priority to and the benefit of Korean Patent Application No. 10-2021-0107954, filed on Aug. 17, 2021, and Korean Patent Application No. 10-2022-0101895, filed Aug. 16, 2022, the disclosures of which are incorporated herein by reference in its entirety.

FIELD

The present disclosure relates to an agricultural work vehicle that is used to grow crops required for human life by using land.

BACKGROUND

Agricultural work vehicles are used to grow crops required for human life by using land. For example, combines, tractors, etc. are agricultural work vehicles. Combines are used to cut and thresh crops such as rice, barley, wheat, soybeans, etc. Tractors perform the work required to grow crops by using traction force. Such agricultural work vehicles include a transmission to adjust torque, speed, etc. as needed during a work process.

Due to the nature of work, these agricultural work vehicles experience frequent forward and backward shifting to switch between forward driving and backward driving. In order to perform forward and backward shifting, braking using a brake first needs to be performed by the operation of a brake pedal. Furthermore, in order to perform braking using a brake, a forward-reverse clutch needs to be disengaged by the operation of a shuttle lever. Even when the brake pedal is operated to perform braking using a brake in a state in which the forward-reverse clutch is not disengaged through the operation of the shuttle lever, the actual braking of an agricultural work vehicle is not performed due to the weight of the agricultural work vehicle itself, the output of an engine, and/or the like.

As described above, conventionally, braking using a brake can be performed by operating the brake pedal only after the forward-reverse clutch has been disengaged by the operation of the shuttle lever. Therefore, there are the problems of increasing fatigue for an operator who drive the agricultural work vehicle due to operation during a work process and increasing the difficulty of driving of the agricultural work vehicle.

SUMMARY

The present disclosure has been conceived to overcome the above-described problems, and is intended to provide an agricultural work vehicle that can reduce the fatigue imposed on an operator due to operation during a work process and reduce the difficulty of driving.

In order to overcome the above-described problem, the present disclosure may include the following configuration.

According to the present disclosure, there is provided an agricultural work vehicle including: a vehicle body configured to support an engine; a transmission configured to perform shifting on drive generated by the engine; a braking unit implemented as a hydraulic brake or a mechanical brake, and configured to reduce the travelling speed of the vehicle body and control the deceleration of each of left and right wheels; an operation unit provided in the vehicle body; and a control unit configured to control the transmission and the braking unit using an operation signal provided from the operation unit; wherein the transmission includes a forward-reverse clutch configured to selectively transmit the drive generated by the engine using friction between a plurality of friction members; wherein the operation unit includes: a brake pedal unit including a plurality of pedals that control the deceleration of the left and right wheels, respectively, and configured to generate a braking signal for the brake unit; and a shuttle lever configured to generate a forward and backward driving signal for the forward-reverse clutch; and wherein the control unit includes a conjunctive operation module configured to, when switching to an conjunctive operation mode is performed, control the braking unit and the forward-reverse clutch so that both the braking rate at which the braking unit reduces the travelling speed of the vehicle body and the drive transmission rate at which the forward-reverse clutch transmits drive are adjusted in response to the operation of the brake pedal unit.

According to the present disclosure, the following effects may be achieved.

The present disclosure is implemented such that both the braking unit and the forward-reverse clutch can be controlled only by operating the brake pedal unit without the separate operation of the shuttle lever. Accordingly, the present disclosure may control the travelling speed of the vehicle body by adjusting the braking rate and the drive transmission rate only by operating the brake pedal unit without the separate operation of the shuttle lever. Therefore, the present disclosure may reduce the fatigue imposed on an operator due to operation during a work process and reduce the difficulty of driving even when forward and backward shifting is frequently performed due to the nature of work.

The present disclosure is implemented such that, even when the braking unit is implemented as a hydraulic brake or a mechanical brake rather than an electronic braking unit, both the braking unit and the forward-reverse clutch can be controlled only by operating the brake pedal unit without the separate operation of the shuttle lever. Therefore, the present disclosure may improve the convenience and ease of operation for an operator while significantly reducing the manufacturing cost compared to that implemented using an electronic braking unit.

DETAILED DESCRIPTION

Embodiments of an agricultural work vehicle according to the present disclosure will be described in detail below with reference to the accompanying drawings.

Figure 1:
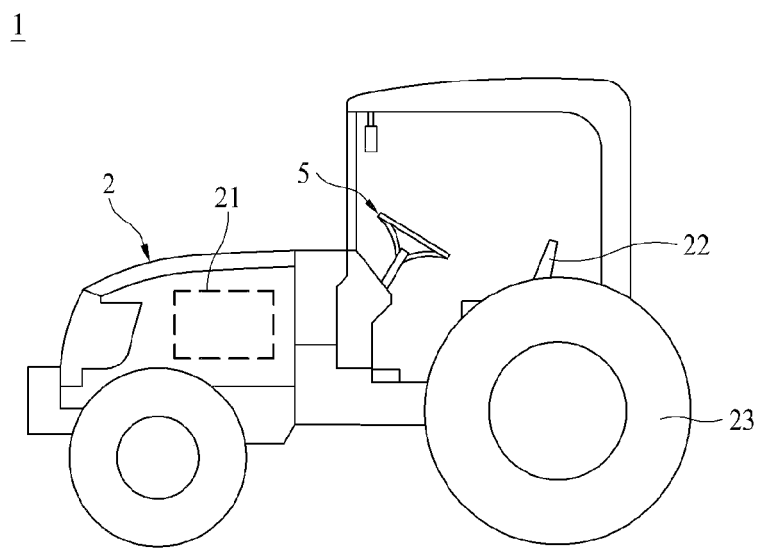
FIG. 1 is a schematic side view showing an example of an agricultural work vehicle.
Figure 2:
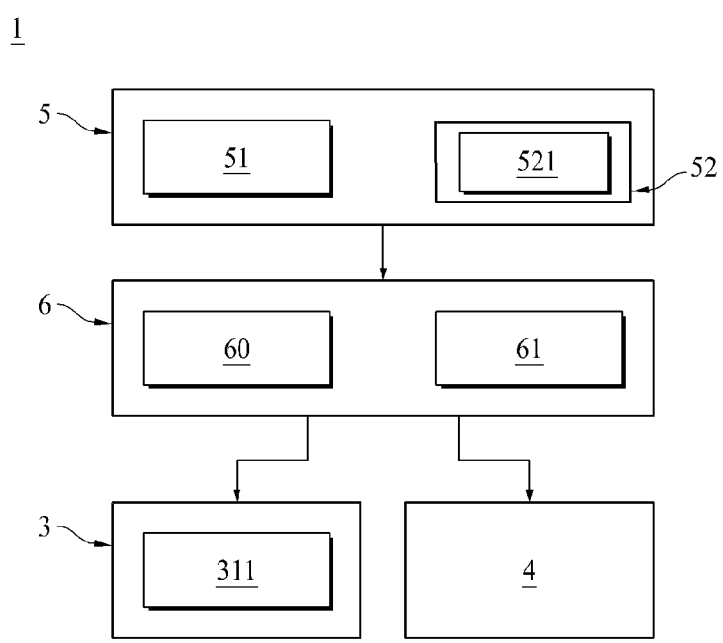
FIG. 2 is a schematic block diagram of the agricultural work vehicle according to the present disclosure.

Referring to FIGS. 1 and 2, an agricultural work vehicle 1 according to the present disclosure is used to grow crops required for human life by using land. For example, the agricultural work vehicle 100 may be a tractor, a combine, or the like. The agricultural work vehicle 1 according to the present disclosure may include a vehicle body 2, a transmission 3, a braking unit 4, an operation unit 5, and a control unit 6.

Referring to FIGS. 1 and 2, the vehicle body 2 supports an engine 21. The vehicle body 2 may form the overall appearance of the agricultural work vehicle 1 according to the present disclosure. The engine 21 may be coupled to the vehicle body 2. The vehicle body 2 may be provided with a driver's seat 22. As a user sits on the driver's seat 22 and operates the operation unit 5, the agricultural work vehicle 1 according to the present disclosure may perform predetermined work. The agricultural work vehicle 1 according to the present disclosure may also perform predetermined work in an autonomous driving manner. Left and right wheels 23, the transmission 3, the braking unit 4, the operation unit 5, and the control unit 6 may be coupled to the vehicle body 2. The left and right wheels 23 include a wheel disposed on the left side of the vehicle body 2, and a wheel disposed on the right side of the vehicle body 2. In this case, the braking unit 4 may control the deceleration of each of the left and right wheels 23. When the drive generated by the engine 21 is transmitted to the left and right wheels 23 through the transmission 3, the vehicle body 2 may drive forward or backward as the left and right wheels 23 rotate.

Referring to FIGS. 1 to 5, the transmission 3 performs shifting on the drive generated by the engine 21. The transmission 3 may be coupled to the vehicle body 2. The transmission 3 may be controlled by the control unit 6. The transmission 3 may include a forward and backward shift unit 31 (shown in FIG. 5) and a driving shift unit 32 (shown in FIG. 5).

The forward and backward shift unit 31 performs forward and backward shifting on the drive generated from the engine 21. The forward and backward shift unit 31 may include a forward-reverse clutch 311. The forward and backward shift unit 31 may transmit the drive, on which forward and backward shifting has been performed, to the driving shift unit 32. When the forward-reverse clutch 311 is engaged, the drive generated from the engine 21 may be transmitted to the driving shift unit 32 after forward and backward shifting has been performed on the drive. When the forward-reverse clutch 311 is disengaged, the drive generated from the engine 21 is not transmitted to the driving shift unit 32.

The forward-reverse clutch 311 may selectively transmit the drive, generated by the engine 21, using the friction between a plurality of friction members (not shown). When the friction members come into contact with each other, the forward-reverse clutch 311 is engaged and is thus in a state capable of transmitting drive. When the friction members are spaced apart from each other, the forward-reverse clutch 311 is disengaged and is thus in a state incapable of transmitting drive. Depending on the degree to which the friction members are in contact with each other, the drive transmission rate at which the forward-reverse clutch 311 transmits drive may be adjusted. In this case, as the contact force between the friction members increases, the drive transmission rate may increase. An increase in the drive transmission rate means that the rate at which the drive transmitted from the engine 21 is transmitted to the driving shift unit 32 increases. As the contact force between the friction members decreases, the drive transmission rate may decrease. A decrease in the drive transmission rate means that the rate at which the drive transmitted from the engine 21 is transmitted to the driving shift unit 32 decreases. When the drive transmission rate decreases, the braking performed by the braking unit 4 may be performed more smoothly. The forward-reverse clutch 311 may be implemented as a multi-disk clutch that selectively transmits drive using friction. Meanwhile, the forward and backward shift unit 31 may include at least one gear and at least one sleeve for forward and backward shifting.

The driving shift unit 32 performs drive shifting on the drive transmitted from the engine 21. The driving shift unit 32 may include a driving clutch. The driving shift unit 32 may perform drive shifting on the drive transmitted from the forward and backward shift unit 31. When the driving clutch is engaged, the drive transmitted from the forward and backward shift unit 31 may be transmitted to an axle after the drive shifting has been performed on the drive. When the driving clutch is disengaged, the drive transmitted from the forward and backward shift unit 31 is not transmitted to the axle. The driving clutch may be implemented as a multi-plate clutch that selectively transmits drive using friction. In this case, the driving clutch may be engaged to transmit drive by bringing the plurality of friction members into contact with each other. The driving clutch may be disengaged not to transmit drive by separating the plurality of friction members from each other. The driving shift unit 32 may include a plurality of driving clutches. Meanwhile, the driving shift unit 32 may include at least one gear and at least one sleeve for drive shifting.

Although not shown, the driving shift unit 32 may include a main shift unit and a subordinate shift unit. The main shift unit and the subordinate shift unit each perform shifting on drive. The main shift unit and the subordinate shift unit may individually perform shifting corresponding to shifting stages. When the main shift unit is disposed ahead of the subordinate shift unit based on the direction in which the drive is transmitted, the drive is transmitted to the subordinate shift unit after the main shift unit has performed shifting on the drive, and the drive is transmitted to the axle after the subordinate shift unit has performed shifting on the drive. When the subordinate shift unit is disposed ahead of the main shift unit based on the direction in which the drive is transmitted, the drive is transmitted to the main shift unit after the subordinate shift unit has performed shifting on the drive, and the drive is transmitted to the axle after the main shift unit has performed shifting on the drive.

Referring to FIGS. 1 to 4, the braking unit 4 is used to reduce the travelling speed of the vehicle body 2. The braking unit 4 may be coupled to the vehicle body 2. The braking unit 4 may be implemented as a hydraulic brake or a mechanical brake. The braking unit 4 may reduce the travelling speed of the vehicle body 2 using friction. In this case, the braking unit 4 may include a disk (not shown) that implements friction. Since the braking unit 4 is implemented as a hydraulic brake or a mechanical brake, the manufacturing cost of the agricultural work vehicle 1 according to the present disclosure may be significantly reduced compared to that of the agricultural work vehicle implemented using an electronic braking unit. The braking unit 4 may control the deceleration of each of the left and right wheels 23. In this case, the braking unit 4 may control the deceleration of each of the wheel disposed on the left side of the vehicle body 2 and the wheel disposed on the right side of the vehicle body 2 using friction.

Referring to FIGS. 1 to 4, the operation unit 5 is provided in the vehicle body 2. The operation unit 5 may be disposed on the driver's seat 22 and operated by an operator. Once the operation unit 5 has been operated, the operation unit 5 may generate an operation signal and then provide the operation signal to the control unit 6. The control unit 6 may control the transmission 3 and the braking unit 4 using the operation signal. The operation unit 5 may provide the operation signal to the control unit 6 through wired communication, wireless communication, and/or the like.

The operation unit 5 may include a shuttle lever 51 and a brake pedal unit 52.

The shuttle lever 51 is intended to control forward and backward shifting. The shuttle lever 51 may generate a forward and backward driving signal for the forward-reverse clutch 311. The shuttle lever 51 may provide the forward and backward driving signal to the control unit 6. The control unit 6 may control the forward-reverse clutch 311 using the forward and backward driving signal. The shuttle lever 51 may be put into a forward and backward operation state to move the vehicle body 2 forward or backward. In this case, the shuttle lever 51 may generate a forward and backward driving signal and provide it to the control unit 6. The shuttle lever 51 may be put into a neutral operation state not to move the vehicle body 2 forward or backward. In this case, the shuttle lever 51 may generate a neutral signal and provide it to the control unit 6. The control unit 6 may control the forward-reverse clutch 311 using the neutral signal. The shuttle lever 51 may be put into the forward/backward operation state or the neutral operation state by the operation of an operator.

The brake pedal unit 52 is intended to control deceleration. The brake pedal unit 52 may generate a braking signal for the braking unit 4. The brake pedal unit 52 may provide the braking signal to the control unit 6. The control unit 6 may control the braking unit 4 using the braking signal. The brake pedal unit 52 may be put into a braking state in which the travelling speed of the vehicle body 2 is reduced. In this case, the brake pedal unit 52 may generate a braking signal and provide it to the control unit 6. The brake pedal unit 52 may be put into a non-braking state in which the travelling speed of the vehicle body 2 is not reduced. In this case, the brake pedal unit 52 may generate a non-braking signal and provide it to the control unit 6. The control unit 6 may control the braking unit 4 using the non-braking signal. The brake pedal unit 52 may be put into the braking state or the non-braking state by the operation of an operator. The brake pedal unit 52 may be operated by a foot of an operator.

The brake pedal unit 52 may be rotatably coupled to the vehicle body 2. The brake pedal unit 52 may be rotated between the lowest rotation angle and the maximum rotation angle. When the brake pedal unit 52 is disposed at a position corresponding to the lowest rotation angle, the brake pedal unit 52 may be in the non-braking state. When the brake pedal unit 52 is disposed at a position corresponding to the maximum rotation angle, the brake pedal unit 52 may be in the braking state. Depending on the rotation angle of the brake pedal unit 52, the braking rate at which the braking unit 4 reduces the travelling speed of the vehicle body 2 may be adjusted. In this case, the braking rate may be adjusted by adjusting the frictional force caused by the braking unit 4 according to the rotation angle of the brake pedal unit 52. The rotation angle of the brake pedal unit 52 is based on the lowest rotation angle. As the rotation angle of the brake pedal unit 52 increases, the braking rate may increase. In this case, the braking rate may increase as the frictional force caused by the braking unit 4 increases. As the rotation angle of the brake pedal unit 52 decreases, the braking rate caused by the braking unit 4 may decrease. In this case, the braking rate may decrease as the frictional force caused by the braking unit 4 decreases. The brake pedal unit 52 may be rotated by the pedal force applied by an operator.

The brake pedal unit 52 may include a plurality of pedals 521. The pedals 521 may control the deceleration of the left and right wheels 30, respectively. For example, the deceleration of the wheel disposed on the left side of the vehicle body 2 may be controlled by the left pedal, and the deceleration of the wheel disposed on the right side of the vehicle body 2 may be controlled by the right pedal. When the pedals 521 are not engaged with each other, the pedals 521 may be individually rotated between the minimum rotation angle and the maximum rotation angle. When the pedals 521 are engaged with each other, the pedals 521 may be rotated together between the lowest rotation angle and the maximum rotation angle. When the pedals 521 are engaged with each other, the brake pedal unit 52 may generate an engagement signal and provide the generated engagement signal to the control unit 6. When the pedals 521 are engaged with each other, the pedals 521 may be rotated at the same rotation angle. The pedals 521 may be implemented to be engaged with or disengaged from each other using magnetic force, links, and/or the like.

Referring to FIGS. 1 to 4, the control unit 6 controls the transmission 3 and the braking unit 4. The control unit 6 may control the transmission 3 and the braking unit 4 using an operation signal provided from the operation unit 5. The control unit 6 may be coupled to the vehicle body 2. The control unit 6 may control the transmission 3 and the braking unit 4 by providing control signals to the transmission 3 and the braking unit 4 through wired communication, wireless communication, and/or the like.

The control unit 6 may include a conjunctive operation module 61.

When switching to the conjunctive operation mode is performed, the conjunctive operation module 61 controls both the braking unit 4 and the forward-reverse clutch 311 in conjunction with the operation of the brake pedal unit 52. In the conjunctive operation mode, the conjunctive operation module 61 may control the braking unit 4 and the forward-reverse clutch 311 so that the braking rate at which the braking unit 4 reduces the travelling speed of the vehicle body 2 and the drive transmission rate at which the forward-reverse clutch 311 transmits drive are both to be adjusted in response to the operation of the brake pedal unit 52. Accordingly, the agricultural work vehicle 1 according to the present disclosure may achieve the following operations and effects.

First, the agricultural work vehicle 1 according to the present disclosure is implemented to control both the braking unit 4 and the forward-reverse clutch 311 only by operating the brake pedal unit 52 without the separate operation of the shuttle lever 51 by means of the conjunctive operation module 61. Accordingly, the agricultural work vehicle 1 according to the present disclosure may adjust the braking rate and the drive transmission rate only by operating the brake pedal unit 52 without the separate operation of the shuttle lever 51, thereby adjusting the travelling speed of the vehicle body 2. Therefore, the agricultural work vehicle 1 according to the present disclosure may reduce the fatigue imposed on an operator due to operation during a work process and reduce driving difficulty even when forward and backward shifting in which forward driving and backward driving are switched with each other is frequently performed due to the nature of work.

Second, the agricultural work vehicle 1 according to the present disclosure is implemented to control both the braking unit 4 and the forward-reverse clutch 311 only by operating the brake pedal unit 52 without the separate operation of the shuttle lever 51 by means of the conjunctive operation module 61 even when the braking unit 4 is implemented as a hydraulic brake or a mechanical brake rather than an electronic braking unit. Accordingly, the agricultural work vehicle 1 according to the present disclosure may significantly reduce the manufacturing cost and improve the convenience and ease of the operation for an operator compared to that implemented using an electronic braking unit.

In the conjunctive operation mode, the conjunctive operation module 61 may control both a braking unit driving mechanism that controls the operation of the braking unit 4 according to the operation of the braking pedal unit 52 and a forward and backward driving mechanism that controls the operation of the forward-reverse clutch 311, thereby adjusting both the braking rate and the drive transmission rate. The braking unit driving mechanism may control the operation of the braking unit 4 while being operated by the hydraulic pressure exerted by a working fluid, electricity, or the like. The forward and backward driving mechanism may control the operation of the forward-reverse clutch 311 while being operated by the hydraulic pressure exerted by a working fluid, electricity, or the like. Meanwhile, in the conjunctive operation mode, the pedals 521 of the brake pedal unit 52 may be in the state of being engaged with each other. Accordingly, the pedals 521 may be rotated at the same rotation angle. Hereinafter, in the conjunctive operation mode, a description of the rotation angle of the brake pedal unit 52 may mean the rotation angle when the pedals 521 are engaged with each other.

Meanwhile, when switching to a release mode in which the conjunctive operation mode is released is performed, the control unit 6 may control the forward-reverse clutch 311 when the shuttle lever 51 is operated, and may control the braking unit 4 when the brake pedal unit 52 is operated. That is, in the release mode, the forward-reverse clutch 311 is not controlled in conjunction with the operation of the brake pedal unit 52. In this case, the control unit 6 may include a control module 60. The control module 60 individually controls the forward-reverse clutch 311 and the braking unit 4. Regardless of whether the brake pedal unit 52 is operated, the control module 60 may operate the forward-reverse clutch 311 depending on which of a forward and backward driving signal and a neutral signal is provided from the shuttle lever 51. In this case, the control module 60 may control the forward-reverse clutch 311 by controlling the forward and backward driving mechanism. Regardless of whether the shuttle lever 51 is operated, the control module 60 may control the braking unit 4 depending on whether a braking signal or a non-braking signal is provided from the braking pedal unit 52. In this case, the control module 60 may control the braking unit 4 by controlling the braking unit driving mechanism.

In the conjunctive operation mode, the conjunctive operation module 61 may control the braking unit 4 and the forward-reverse clutch 311 so that, as the rotation angle of the brake pedal unit 52 increases, the braking rate can increase and the drive transmission rate can decrease. Accordingly, the agricultural work vehicle 1 according to the present disclosure may be decelerated by increasing the braking rate and decreasing the drive transmission rate in such a manner that an operator only increases the pedal force adapted to step on the brake pedal unit 52 without operating the shuttle lever 51. In this case, the conjunctive operation module 61 may increase the braking rate by controlling the braking unit 4 so that the frictional force applied between the disks included in the braking unit 4 can increase, and may decrease the drive transmission rate by controlling the forward-reverse clutch 311 so that the frictional force applied between the friction members included in the forward-reverse clutch 311 can decrease. Meanwhile, in the conjunctive operation mode, an increase in the braking rate may mean an increase in the braking rate for each of the left and right wheels 23.

In the conjunctive operation mode, the conjunctive operation module 61 may control the braking unit 4 and the forward-reverse clutch 311 so that, as the rotation angle of the brake pedal unit 52 decreases, the braking rate can decrease and the drive transmission rate can increase. Accordingly, the agricultural work vehicle 1 according to the present disclosure may maintain the travelling speed or accelerate the travelling speed by decreasing the braking rate and increasing the drive transmission rate in such a manner that an operator only reduces the pedal force adapted to step on the brake pedal unit 52 without operating the shuttle lever 51. In this case, the conjunctive operation module 61 may decrease the braking rate by controlling the braking unit 4 so that the frictional force applied between the disks included in the braking unit 4 can be reduced, and may increase the drive transmission rate by controlling the forward-reverse clutch 311 so that the frictional force applied between the friction members included in the forward-reverse clutch 311 can be increased. Meanwhile, in the conjunctive operation mode, a decrease in the braking rate may mean a decrease in the braking rate for each of the left and right wheels 23.

When the rotation angle of the brake pedal unit 52 changes in an increasing direction in the conjunctive operation mode, the conjunctive operation module 61 may control the braking unit 4 and the forward-reverse clutch 311 so that the braking rate and the drive transmission rate can be adjusted according to a braking profile BP (shown in FIG. 3) in which the drive transmission rate decreases as the braking rate increases. That is, when an operator increases the force with which he or she steps on the brake pedal unit 52 in the conjunctive operation mode, the conjunctive operation module 61 may adjust the braking rate and the drive transmission rate according to the braking profile (BP). In this case, the conjunctive operation module 61 may control the forward-reverse clutch 311 so that, in the conjunctive operation mode, the drive transmission rate can be adjusted according to the braking profile (BP) in which the drive transmission rate decreases as the rotation angle of the brake pedal unit 52 increases.

When the rotation angle of the brake pedal unit 52 is changed in a decreasing direction in the conjunctive operation mode, the conjunctive operation module 61 may control the braking unit 4 and the forward-reverse clutch 311 so that the braking rate and the drive transmission rate can be adjusted according to a release profile RP (shown in FIG. 4) in which the drive transmission rate increases as the braking rate decreases. That is, when an operator reduces the force with which the operator steps on the brake pedal unit 52 in the conjunctive operation mode, the conjunctive operation module 61 may adjust the braking rate and the drive transmission rate according to the release profile RP. In this case, the conjunctive operation module 61 may control the forward-reverse clutch 311 so that the drive transmission rate can be adjusted according to the release profile RP in which the drive transmission rate increases as the rotation angle of the brake pedal unit 52 decreases in the conjunctive operation mode.

As described above, the agricultural work vehicle 1 according to the present disclosure is implemented such that, in the conjunctive operation mode, the braking profile BP and the release profile RP can be distinguished from each other according to the rotation direction of the braking pedal unit 52 and then the braking rate and the drive transmission rate can be adjusted. Accordingly, in the agricultural work vehicle 1 according to the present disclosure, the braking rate and the drive transmission rate may be adjusted to correspond to the driving state in the conjunctive operation mode, thereby improving the ease and convenience of driving.

The braking profile BP and the release profile RP may be implemented differently. For example, based on FIG. 3, the braking profile BP may be formed in a curved shape that is convex toward the inside in which an origin is located. Based on FIG. 4, the release profile RP may be formed in a curved shape that is convex toward the outside. Accordingly, the agricultural work vehicle 1 according to the present disclosure may have different changes in the braking rate and the drive transmission rate depending on the driving state in the conjunctive operation mode, thereby the present disclosure may improve the ease and convenience of driving.

In this case, an implementation may be made such that, when the rotation angle of the brake pedal unit 52 changes in a change section CS (shown in FIGS. 3 and 4) between a preset first rotation angle and a preset second rotation angle that is larger than the first rotation angle, the braking profile BP has a smaller drive transmission rate than the release profile RP. Furthermore, an implementation may be made such that, when the rotation angle of the brake pedal unit 52 changes in the change section CS, the release profile RP has a larger drive transmission rate than the brake profile BP. For example, when the braking pedal unit 52 has a first rotation angle A1 (shown in FIGS. 3 and 4) in the change section (CS), the first drive transmission rate P1 (shown in FIGS. 3 and 4) of the braking profile BP may be smaller than the second drive transmission rate P2 (shown in FIGS. 3 and 4) of the release profile RP.

Accordingly, the agricultural work vehicle 1 according to the present disclosure may be implemented such that the braking profile BP has a smaller drive transmission rate than the release profile RP in the change section CS. Accordingly, an implementation may be made such that the travelling speed may be reduced more when an operator increases the force with which the operator steps on the brake pedal unit 52 than when the operator decreases the force with which the operator steps on the brake pedal unit 52. Furthermore, the agricultural work vehicle 1 according to the present disclosure may be implemented such that the release profile RP has a larger drive transmission rate than the braking profile BP in the change section CS. Accordingly, an implementation may be made such that the travelling speed may be accelerated more when an operator decreases the force with which the operator steps on the brake pedal unit 52 than when the operator increases the force with which the operator steps on the brake pedal unit 52. Therefore, the agricultural work vehicle 1 according to the present disclosure is implemented to further improve the ease and convenience of driving.

Meanwhile, an implementation may be made such that, when the rotation angle of the brake pedal unit 52 changes in the change section CS, the braking profile BP has a smaller drive transmission rate than the release profile RP for each rotation angle of the braking pedal unit 52. Furthermore, an implementation may be made such that, when the rotation angle of the brake pedal unit 52 changes in the change section CS, the release profile RP has a larger drive transmission rate than the brake profile BP for each rotation angle of the brake pedal unit 52.

Meanwhile, the first rotation angle and the second rotation angle may be set in advance by an operator. The first rotation angle may be set to be larger than the lowest rotation angle of the brake pedal unit 52 and smaller than the second rotation angle. The second rotation angle may be set to be larger than the first rotation angle and smaller than the maximum rotation angle of the brake pedal unit 52. For example, when the lowest rotation angle of the brake pedal unit 52 is defined as 0% and the maximum rotation angle of the brake pedal unit 52 is defined as 100%, the first rotation angle may correspond to 5% of the maximum rotation angle, and the second rotation angle may correspond to 90% of the maximum rotation angle.

Figure 3:
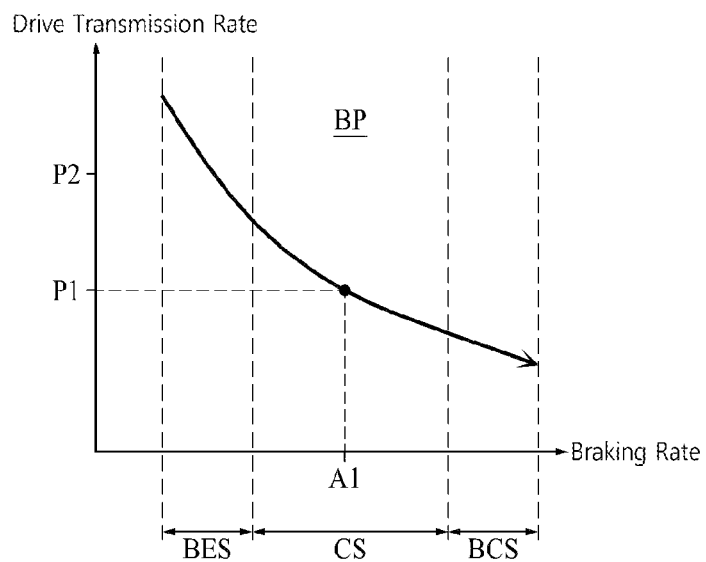
FIG. 3 is a graph schematically showing a braking profile in the agricultural work vehicle according to the present disclosure.

Referring to FIGS. 2 and 3, the braking profile BP may be implemented such that, when the rotation angle of the brake pedal unit 52 changes in a braking entry section BES (shown in FIG. 3) that is larger than the lowest rotation angle and smaller than the first rotation angle, the amount of change in the drive transmission rate compared to the amount of change in the braking rate is larger than when the rotation angle of the brake pedal unit 52 changes in the change section CS. That is, the braking profile BP is implemented such that the drive transmission rate decreases more rapidly in the braking entry section BES than in the change section CS. Accordingly, the agricultural work vehicle 1 according to the present disclosure is implemented such that the frictional force between the friction members included in the forward-reverse clutch 311 can be reduced more rapidly at the beginning when an operator starts to step on the brake pedal unit 52. Accordingly, the agricultural work vehicle 1 according to the present disclosure may reduce the risk of the forward-reverse clutch 311 being damaged or broken due to braking using the braking unit 4. Meanwhile, the braking profile BP may be implemented such that, when the rotation angle of the brake pedal unit 52 changes in the braking entry section BES, the amount of change in the drive transmission rate compared to the amount of change in the rotation angle of the brake pedal unit 52 is larger than when the rotation angle of the brake pedal unit 52 changes in the change section CS.

The braking profile BP may be implemented such that, when the rotation angle of the braking pedal unit 52 changes in a braking finish section BCS (shown in FIG. 3), the amount of change in the drive transmission rate compared to the amount of change in the braking rate is smaller than when the rotation angle of the brake pedal unit 52 changes in the change section CS. That is, the braking profile BP is implemented such that the drive transmission rate decreases more gradually in the braking finish section BCS than in the change section CS. Accordingly, the agricultural work vehicle 1 according to the present disclosure is implemented such that the frictional force between the friction members included in the forward-reverse clutch 311 can be reduced more gradually immediately before an operator completely steps on the brake pedal unit 52. Accordingly, the agricultural work vehicle 1 according to the present disclosure may reduce shaking, vibration, etc. caused by braking using the braking unit 4. Meanwhile, the braking profile BP may be implemented such that, when the rotation angle of the brake pedal unit 52 changes in the braking finish section BCS, the amount of change in the drive transmission rate compared to the amount of change in the rotation angle of the braking pedal unit 52 is smaller than when it changes in the change section CS.

The braking profile BP may be implemented such that, when the rotation angle of the braking pedal unit 52 changes in the braking finish section BCS (shown in FIG. 3), the amount of change in the drive transmission rate compared to the amount of change in the braking rate is smaller than when the rotation angle of the brake pedal unit 52 changes in the braking entry section BES. That is, the braking profile BP is implemented such that the drive transmission rate decreases more gradually in the braking finish section BCS than in the braking entry section BES. Accordingly, the agricultural work vehicle 1 according to the present disclosure is implemented such that the frictional force between the friction members included in the forward-reverse clutch 311 can be reduced more gradually immediately before an operator completely steps on the brake pedal unit 52. Therefore, the agricultural work vehicle 1 according to the present disclosure may reduce shaking, vibration, etc. caused by braking using the braking unit 4. Meanwhile, the braking profile BP may be implemented such that, when the rotation angle of the brake pedal unit 52 changes in the braking finish section BCS, the amount of change in the drive transmission rate compared to the amount of change in the rotation angle of the brake pedal unit 52 is smaller than when the rotation angle of the brake pedal unit 52 changes in the braking entry section BES.

Figure 4:
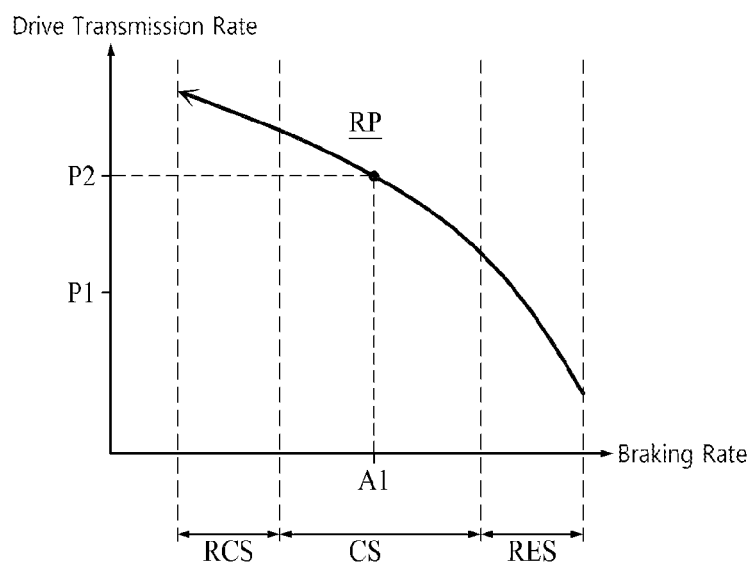
FIG. 4 is a graph schematically showing a release profile in the agricultural work vehicle according to the present disclosure.
Figure 5:
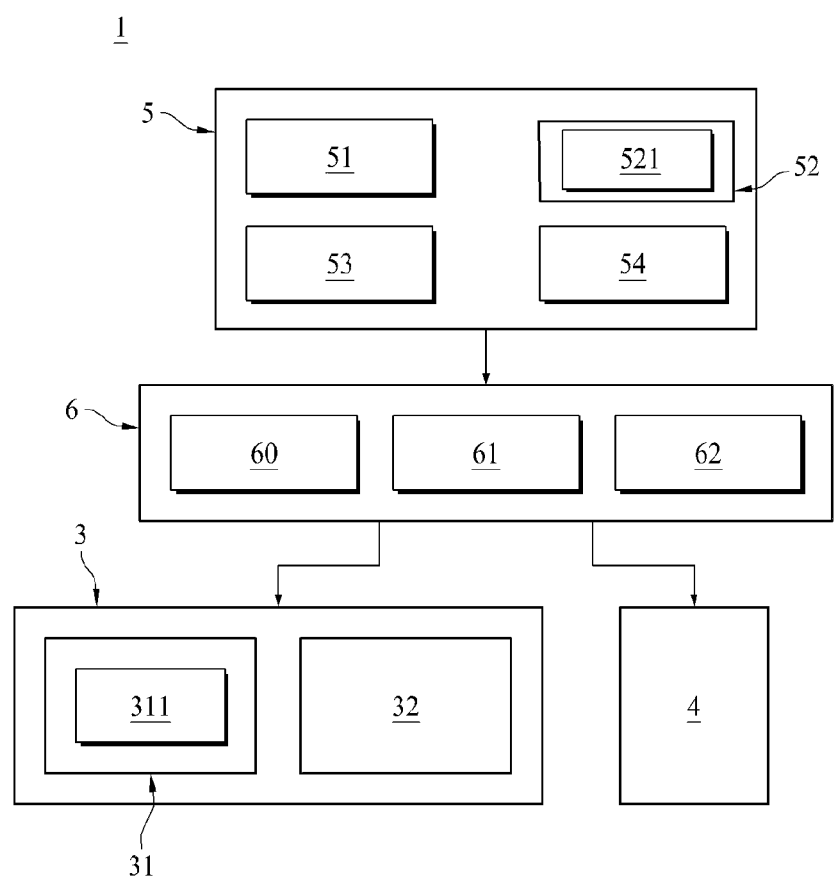
FIGS. 5 and 6 are schematic block diagrams of embodiments of the agricultural work vehicle according to the present disclosure.
Figure 6:
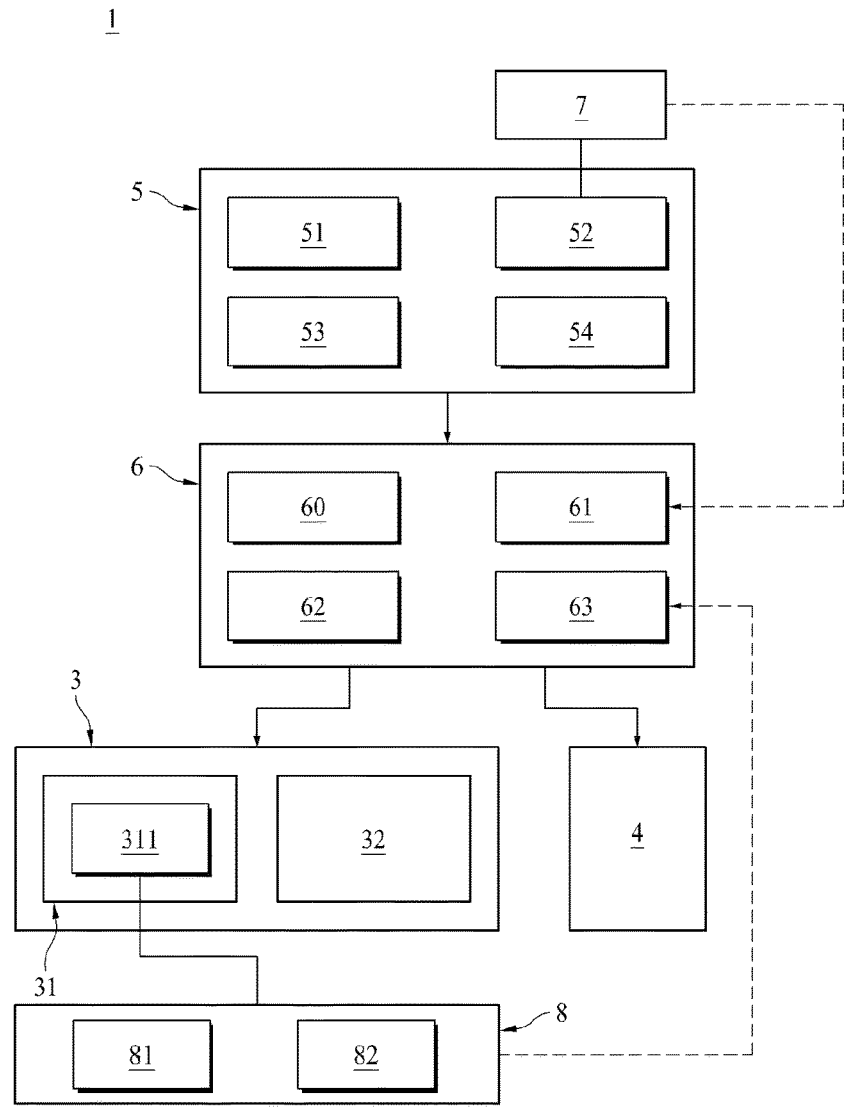

Referring to FIGS. 2 and 4, the release profile RP may be implemented such that, when the rotation angle of the brake pedal unit 52 changes in the release entry section RES (shown in FIG. 4) that is smaller than the maximum rotation angle and larger than the second rotation angle, the amount of change in the drive transmission rate compared to the amount of change in the braking rate is larger than when the rotation angle of the brake pedal unit 52 changes in the change section CS. That is, the release profile RP is implemented such that the drive transmission rate increases more rapidly in the release entry section RES than in the change section CS. Accordingly, the agricultural work vehicle 1 according to the present disclosure is implemented such that the frictional force between the friction members included in the forward-reverse clutch 311 can increase more rapidly at the beginning when an operator reduces the force adapted to step on the brake pedal 52 while completely stepping on the brake pedal 52. Therefore, the agricultural work vehicle 1 according to the present disclosure may improve responsiveness to an increase in travelling speed when braking using the braking unit 4 is released. Furthermore, the agricultural work vehicle 1 according to the present disclosure is implemented such that the friction members included in the forward-reverse clutch 311 can be prevented from completely coming into contact with each other at the beginning when an operator reduces the force adapted to step on the brake pedal 52 while completely stepping on the brake pedal 52. Therefore, the agricultural work vehicle 1 according to the present disclosure may prevent the drive generated by the engine 21 from being transmitted suddenly at the beginning when brake is released using the braking unit 4, thereby preventing a situation in which the engine 21 is stopped and also improving the safety of driving on slopes, etc. Meanwhile, when the rotation angle of the brake pedal unit 52 changes in the release entry section RES, the release profile RP may be implemented such that the amount of change in the drive transmission rate compared to the amount of change in the rotation angle of the brake pedal unit 52 is larger than when it changes in the change section CS.

The release profile RP may be implemented such that, when the rotation angle of the brake pedal unit 52 changes in the release finish section RCS (shown in FIG. 4) that is larger than the lowest rotation angle and smaller than the first rotation angle, the amount of change in the drive transmission rate compared to the amount of change in the braking rate is smaller than when the rotation angle of the pedal unit 52 changes in the change section CS. That is, the release profile RP is implemented such that the drive transmission rate increases more gradually in the release finish section RCS than in the change section CS. Accordingly, the agricultural work vehicle 1 according to the present disclosure is implemented such that the frictional force between the friction members included in the forward-reverse clutch 311 can increase more gradually immediately before an operator stops stepping on the brake pedal unit 52. Therefore, the agricultural work vehicle 1 according to the present disclosure may reduce shaking, vibration, etc. that are generated when the brake using the braking unit 4 is completely released. Meanwhile, the release profile RP may be implemented such that, when the rotation angle of the brake pedal unit 52 changes in the release completion section RCS, the amount of change in the drive transmission rate compared to the amount of change in the rotation angle of the brake pedal unit 52 is smaller than when the rotation angle of the brake pedal unit 52 changes in the change section CS.

The release profile RP may be implemented such that, when the rotation angle of the brake pedal unit 52 changes in the release finish section RCS (shown in FIG. 4), the amount of change in the drive transmission rate compared to the amount of change in the braking rate is smaller than when the rotation angle of the brake pedal unit 52 changes in the release entry section RES. That is, the release profile RP is implemented such that the drive transmission rate increases more slowly in the release finish section RCS than in the release entry section RES. Accordingly, the agricultural work vehicle 1 according to the present disclosure is implemented such that the frictional force between the friction members included in the forward-reverse clutch 311 can increase more gradually immediately before an operator stops stepping on the brake pedal unit 52. Therefore, the agricultural work vehicle 1 according to the present disclosure may reduce shaking, vibration, etc. that are generated when the brake using the brake unit 4 is completely released. Meanwhile, the release profile RP may be implemented such that, when the rotation angle of the brake pedal unit 52 changes in the release finish section RCS, the amount of change in the drive transmission rate compared to the amount of change in the rotation angle of the brake pedal unit 52 is smaller than when the rotation angle of the brake pedal unit 52 changes in the release entry section RES.

Referring to FIGS. 2 to 5, the control unit 6 may include a switching module 62.

The switching module 62 is intended to switch between the conjunctive operation mode and the release mode. When switching to the conjunctive operation mode is performed by the switching module 62, the forward-reverse clutch 311 and the braking unit 4 may be controlled to operate in conjunction with each other in response to the operation of the braking pedal unit 52. In this case, the forward-reverse clutch 311 and the braking unit 4 may be controlled together by the conjunctive operation module 61. When switching to the release mode is performed by the switching module 62, the forward-reverse clutch 311 may be controlled in response to the operation of the shuttle lever 51, and the brake unit 4 may be controlled in response to the operation of the brake pedal unit 52. In this case, the forward-reverse clutch 311 and the braking unit 4 may be individually controlled by the control module 60.

In the switching module 62, the shuttle lever 51 may generate the forward and backward driving signal, and the brake pedal unit 52 may generate the engagement signal as the pedals 521 are engaged with each other. When it is determined that a parking operation mechanism 53 included in the operation unit 5 has generated a parking release signal adapted to release the parking braking of the vehicle body 2, switching to the conjunctive operation mode may be performed. Accordingly, when it is determined that the shuttle lever 51 has generated the neutral signal, the switching module 62 may not switch to the conjunctive operation mode. In this case, when the current mode is the release mode, the switching module 62 may maintain the release mode. Additionally, when it is determined that the parking operation mechanism 53 has generated a parking brake signal adapted to park the vehicle body 2, the switching module 62 may not switch to the conjunctive operation mode. In this case, when current mode is the release mode, the switching module 62 may maintain the release mode. Furthermore, when it is determined that the brake pedal unit 52 has generated a disengagement signal as the pedals 521 are disengaged from each other, the switching module 62 may not switch to the conjunctive operation mode. In this case, when the current mode is the release mode, the switching module 62 may maintain the release mode. Therefore, the agricultural work vehicle 1 according to the present disclosure is implemented to switch to the conjunctive operation mode using the switching module 62 only when a preset condition is satisfied. The risk of a safety-related accident occurring be reduced by preventing an operator from switching to the conjunctive operation mode in an unintended situation. The switching module 62 may receive the operating signal from the operating unit 5 through wired communication, wireless communication, and/or the like. The switching module 62 may provide a control signal to each of the control module 60 and the conjunctive operation module 61 through wired communication, wireless communication, and the like.

Meanwhile, the parking operation mechanism 53 is intended to control parking braking. The parking operation mechanism 53 may generate a parking brake signal for a parking brake (not shown). The parking operation mechanism 53 may generate a parking release signal for the parking brake. The parking operation mechanism 53 may provide the parking brake signal and the parking release signal to the control unit 6. When the parking brake signal is provided from the parking operation mechanism 53 as the parking operation mechanism 53 is operated to a parking operation state, the control unit 6 may control the parking brake so that the parking brake can apply parking braking to the vehicle body 2. When a parking release signal is provided from the parking operation mechanism 53 as the parking control mechanism 53 is operated to a parking release state, the control unit 6 may control the parking brake so that the parking brake can release the parking braking of the vehicle body 2.

The switching module 62 may switch to the release mode when it is determined that the shuttle lever 51 has generated the neutral signal in the conjunctive operation mode. Accordingly, when it is determined that the shuttle lever 51 has generated the forward and backward driving signal in the conjunctive operation mode, the switching module 62 may maintain the conjunctive operation mode. Therefore, the agricultural work vehicle 1 according to the present disclosure is implemented to be switched to the release mode using the switching module 62 only when a preset condition is satisfied, so that an operator can be prevented from switching to the release mode in an unintended situation, thereby reducing the risk of a safety-related accident occurring. Meanwhile, when it is determined that the shuttle lever 51 has generated the neutral signal and the parking operation mechanism 53 has generated the parking brake signal in the conjunctive operation mode, the switching module 62 may also switch to the release mode.

The switching module 62 may be implemented to determine whether to switch between the conjunctive operation mode and the release mode in response to the operation of the switching operation mechanism 54 included in the operation unit 5. The switching operation mechanism 54 is operated to switch between the conjunctive operation mode and the release mode. The switching operation mechanism 54 may be placed in the driver's seat 22 and operated by an operator. The switching operation mechanism 54 may be implemented as an on/off switch, a lever, a pedal, and/or the like. When the switching operation mechanism 54 is provided, the switching module 62 may switch between the conjunctive operation mode and the release mode as follows.

First, when the switching operation mechanism 54 is operated to the conjunctive operation mode, the switching module 62 may switch to the conjunctive operation mode when it is determined that the shuttle lever 51 has generated the forward and backward driving signal, the brake pedal unit 52 has generated the engagement signal, and the parking operation mechanism 53 has generated the parking release signal. Accordingly, even when it is determined that the shuttle lever 51 has generated the forward and backward driving signal, the brake pedal unit 52 has generated the engagement signal, and the parking operation mechanism 53 has generated the parking release signal, the switching module 62 may maintain the release mode when the switching operation mechanism 54 is not operated to the conjunctive operation mode.

Next, when the switching operation mechanism 54 is operated to the release mode in the conjunctive operation mode, the switching module 62 may switch to the release mode when it is determined that the shuttle lever 51 has generated the neutral signal. Accordingly, even when it is determined that the shuttle lever 51 has generated the neutral signal in the conjunctive operation mode, the switching module 62 may maintain the conjunctive operation mode when the switching operation mechanism 54 is not operated to the release mode. Meanwhile, when the switching operation mechanism 54 is operated to the release mode in the conjunctive operation mode, the switching module 62 may switch to the release mode when it is determined that the shuttle lever 51 has generated the neutral signal and the parking operation mechanism 53 has generated the parking brake signal.

As described above, the agricultural work vehicle 1 according to the present disclosure may be implemented to switch between the switching mode and the release mode only when it is determined that the preset condition is satisfied by the switching module 62 in a state in which operation has been performed by the switching operation mechanism 54. Accordingly, the agricultural work vehicle 1 according to the present disclosure may further reduce the risk of a safety-related accident occurring by preventing an operator from switching between the switching mode and the releasing mode in an unintended situation.

Referring to FIGS. 1 to 6, the agricultural work vehicle 1 according to the present disclosure may include a rotation angle acquisition sensor 7.

The rotation angle acquisition sensor 7 detects the brake pedal unit 52 and acquires the rotation angle of the brake pedal unit 52. The rotation angle acquisition sensor 7 may provide the acquired rotation angle of the brake pedal unit 52 to the control unit 6. In the case of the conjunctive operation mode, the conjunctive operation module 61 may control the braking unit 4 and the forward-reverse clutch 311 using the rotation angle of the braking pedal unit 52 acquired by the rotation angle acquisition sensor 7. In the case of the release mode, the control module 60 may control the brake unit 4 using the rotation angle of the brake pedal unit 52 acquired by the rotation angle acquisition sensor 7. The rotation angle acquisition sensor 7 may be implemented as a potentiometer and/or the like. The rotation angle acquisition sensor 7 may provide the rotation angle of the brake pedal unit 52 to the control unit 6 through wired communication, wireless communication, and/or the like. When the braking pedal unit 52 includes the pedals 521, the agricultural work vehicle 1 according to the present disclosure may include a plurality of the rotation angle acquisition sensors 7. The rotation angle acquisition sensors 7 may acquire the rotation angles of the pedals 521, respectively.

Referring to FIGS. 1 to 8, the agricultural work vehicle 1 according to the present disclosure may include a sensor unit 8.

The sensor unit 8 detects an operation environment in which the forward-reverse clutch 311 is operated. The sensor unit 8 may detect the operation environment of the forward-reverse clutch 311, generate sensing information, and then provide the generated sensing information to the control unit 6. The control unit 6 may correct each of the braking profile BP and the release profile RP using the sensing information.

In this case, the sensor unit 8 may include a hydraulic sensor 81.

The hydraulic sensor 81 measures the hydraulic pressure of a working fluid supplied to the forward-reverse clutch 311. The hydraulic sensor 81 may provide the measured hydraulic pressure of the working fluid to the control unit 6 through wired communication, wireless communication, and/or the like.

When the hydraulic sensor 81 is provided, the control unit 6 may include a correction module 63. The correction module 63 generates a correction value adapted to correct each of the braking profile BP and the release profile RP. When the hydraulic pressure of the working fluid measured by the hydraulic sensor 81 deviates from a preset reference hydraulic pressure value in the conjunctive operation mode, the correction module 63 may generate a correction value adapted to correct each of the braking profile BP and the release profile RP. The reference hydraulic pressure value is the hydraulic pressure range of the working fluid that needs to be supplied to the forward-reverse clutch 311 for each rotation angle of the brake pedal unit 52, and may be set in advance by an operator. The correction value is a flow rate value of the working fluid adapted to correct the difference from the reference hydraulic pressure value for each rotation angle of the brake pedal unit 52, and may be set in advance by an operator.

As described above, the agricultural work vehicle 1 according to the present disclosure may be implemented such that the stable operation of the conjunctive operation mode can be performed using the correction value generated by the correction module 63 even when the flow rate of the working fluid supplied to the forward-reverse clutch 311 is changed due to the leakage of the working fluid, the aging of a hydraulic device for supplying the working fluid to the forward-reverse clutch 311, and/or the like.

For example, when the hydraulic pressure of the working fluid supplied to the forward-reverse clutch 311 according to the rotation angle of the brake pedal unit 52 is lower than the reference hydraulic pressure value, the correction module 63 may generate a correction value adapted to move each of the braking profile BP and the release profile RP toward a first direction (the direction of arrow D1). The first direction (the direction of arrow D1) may be an upward direction for each of the braking profile BP and the release profile RP. Accordingly, the conjunctive operation module 61 may perform control so that the flow rate of the working fluid supplied to the forward-reverse clutch 311 can increase according to the rotation angle of the brake pedal unit 52 compared to that before the reflection of the correction value therein in the conjunctive operation mode. In this case, the conjunctive operation module 61 may control the forward-reverse clutch 311 by reflecting the correction value therein.

For example, when the hydraulic pressure of the working fluid supplied to the forward-reverse clutch 311 according to the rotation angle of the brake pedal unit 52 is higher than the reference hydraulic pressure value, the correction module 63 may generate a correction value adapted to move each of the braking profile BP and the release profile RP toward a second direction (the direction of arrow D2). The second direction (the direction of arrow D2) may be a downward direction for each of the braking profile BP and the release profile RP. Accordingly, the conjunctive operation module 61 may perform control so that the flow rate of the working fluid supplied to the forward-reverse clutch 311 can increase according to the rotation angle of the brake pedal unit 52 compared to that before the reflection of the correction value in the conjunctive operation mode. In this case, the conjunctive operation module 61 may control the forward-reverse clutch 311 by reflecting the correction value therein.

Figure 7:
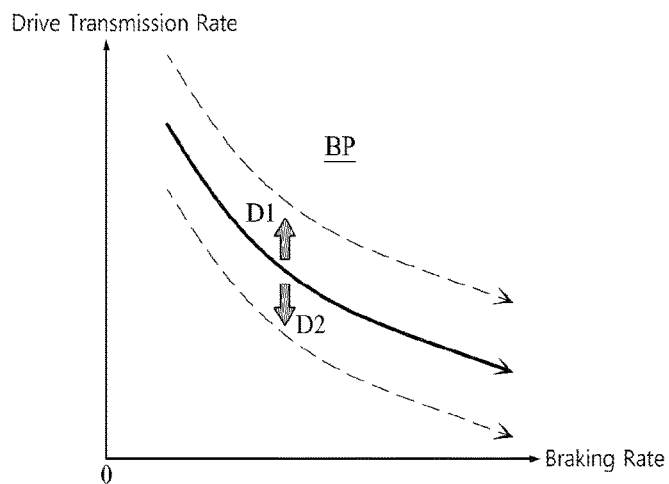
FIG. 7 is a graph schematically showing a braking profile before the reflection of a correction value therein and a braking profile after the reflection of the correction value therein in the agricultural work vehicle according to the present disclosure.
Figure 8:
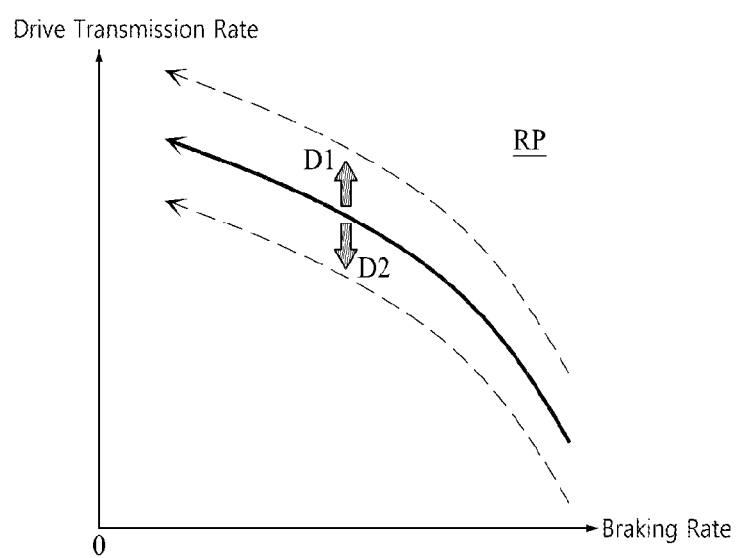
FIG. 8 is a graph schematically showing a release profile before the reflection of a correction value therein and a release profile after the reflection of the correction value therein in the agricultural work vehicle according to the present disclosure.

Meanwhile, the braking profile BP and the release profile RP indicated by the dotted lines in FIGS. 7 and 8 represent profiles after the reflection of the correction value therein. The braking profile BP and the release profile RP indicated by the solid lines represent profiles before the reflection of the correction value therein. In this case, the braking profile BP and the release profile RP are corrected in the upward and downward directions, only the amount of change in the drive transmission rate compared to the amount of change in the rotation angle of the brake pedal unit 52 may be changed, and the amount of change in the braking rate compared to the amount of change in the rotation angle of the brake pedal unit 52 may be maintained without change.

The correction module 63 may provide the generated correction value to the conjunctive operation module 61 through wired communication, wireless communication, and/or the like. When a correction value is provided from the correction module 63, the conjunctive operation module 61 may update the braking profile BP and the release profile RP according to the correction value. Thereafter, the conjunctive operation module 61 may control the forward-reverse clutch 311 and the braking unit 4 according to the updated braking profile BP and release profile RP in the conjunctive operation mode.

The sensor unit 8 may include an oil temperature sensor 82.

The oil temperature sensor 82 measures the temperature of the working fluid supplied to the forward-reverse clutch 311. The oil temperature sensor 82 may provide the measured hydraulic pressure of the working fluid to the control unit 6 through wired communication, wireless communication, and/or the like.

When the temperature of the working fluid measured by the oil temperature sensor 82 deviates from the preset reference temperature value in the conjunctive operation mode, the correction module 63 may generate a correction value adapted to correct each of the braking profile BP and the release profile RP. The reference temperature value is the temperature range of the working fluid that needs to be supplied to the forward-reverse clutch 311, and may be set in advance by an operator. The correction value is a flow rate value of the working fluid adapted to correct the difference between the temperature of the working fluid measured by the oil temperature sensor 82 and the reference temperature value, and may be set in advance by an operator.

As described above, the agricultural work vehicle 1 according to the present disclosure may be implemented such that the stable operation of the conjunctive operation mode can be performed using the correction value generated by the correction module 63 even when the temperature of the working fluid supplied to the forward-reverse clutch 311 changes.

For example, when the temperature of the working fluid measured by the oil temperature sensor 82 is lower than the reference temperature value, the correction module 63 may generate a correction value adapted to move each of the braking profile BP and the release profile RP toward the first direction (the direction of arrow D1). Accordingly, the conjunctive operation module 61 may perform control such that the flow rate of the working fluid supplied to the forward-reverse clutch 311 according to the rotation angle of the brake pedal unit 52 increases compared to that before the reflection of the correction value therein in the conjunctive operation mode. In this case, the conjunctive operation module 61 may control the forward-reverse clutch 311 by reflecting the correction value therein.

For example, when the temperature of the working fluid measured by the oil temperature sensor 82 is higher than the reference temperature value, the correction module 63 may generate a correction value adapted to move each of the braking profile BP and the release profile RP toward the second direction (the direction of arrow D2). Accordingly, the conjunctive operation module 61 may perform control so that the flow rate of the working fluid supplied to the forward-reverse clutch 311 decreases according to the rotation angle of the brake pedal unit 52 compared to that before the reflection of the correction value therein in the conjunctive operation mode. In this case, the conjunctive operation module 61 may control the forward-reverse clutch 311 by reflecting the correction value therein.

Referring to FIGS. 1 to 8, the correction module 63 may correct each of the braking profile BP and the release profile RP so that the drive transmission rate can selectively increase and decrease depending on the shifting stage of the transmission 3. When the shifting stage is lower at the time when switching to the conjunctive operation mode is performed, the correction module 63 may move each of the braking profile BP and the release profile RP toward the first direction (the direction of arrow D1). When the shifting stage is higher at the time when switching to the conjunctive operation mode is performed, the correction module 63 may move each of the braking profile BP and the release profile RP toward the second direction (the direction of arrow D2). As described above, the agricultural work vehicle 1 according to the present disclosure may be implemented such that the drive transmission rate can be increased or decreased by correcting each of the braking profile BP and the release profile RP according to the shifting stage, thereby improving the stability of operation of the conjunctive operation mode.

Meanwhile, the correction module 63 may correct each of the braking profile BP and the release profile RP so that the drive transmission rate can selectively increase and decrease depending on the shifting stage of the subordinate shift unit included in the transmission 3. Furthermore, when the shifting stage is changed in the conjunctive operation mode, the correction module 63 may correct each of the braking profile BP and the release profile RP according to the changed shifting stage. In this case, the conjunctive operation module 61 may update the braking profile BP and the release profile RP according to the correction value provided from the correction module 63, and may control the forward-reverse clutch 311 and the braking unit 4 according to the updated braking profile BP and release profile RP.

The present disclosure described above is not limited to the above-described embodiments and the accompanying drawings. It will be apparent to a person having ordinary skill in the art to which the present disclosure pertains s that various substitutions, modifications, and alterations may be made without departing from the technical spirit of the present disclosure.

The invention claimed is:

1. An agricultural work vehicle comprising:
a vehicle body configured to support an engine;
a transmission configured to perform shifting on drive generated by the engine;
a braking unit implemented as a hydraulic brake or a mechanical brake, and configured to reduce a travelling speed of the vehicle body and control deceleration of each of left and right wheels;
an operation unit provided in the vehicle body; and
a control unit configured to control the transmission and the braking unit using an operation signal provided from the operation unit;
wherein the transmission includes a forward-reverse clutch configured to selectively transmit drive generated by the engine using friction between a plurality of friction members;
wherein the operation unit includes:
a brake pedal unit including a plurality of pedals that control deceleration of the left and right wheels, respectively, and configured to generate a braking signal for the brake unit; and
a shuttle lever configured to generate a forward and backward driving signal for the forward-reverse clutch; and
wherein the control unit includes a conjunctive operation module configured to, when switching to an conjunctive operation mode is performed, control the braking unit and the forward-reverse clutch so that both a braking rate at which the braking unit reduces a travelling speed of the vehicle body and a drive transmission rate at which the forward-reverse clutch transmits drive are adjusted in response to an operation of the brake pedal unit.

2. The agricultural work vehicle of claim 1, wherein:
the control unit includes a switching module that switches between the conjunctive operation mode and a release mode in which the conjunctive operation mode is released; and
the switching module switches to the conjunctive operation mode when it is determined that the shuttle lever has generated a forward and backward driving signal adapted to drive the vehicle body forward or backward, the brake pedal unit has generated an engagement signal as the pedals are engaged with each other, and a parking operation mechanism included in the operation unit has generated a parking release signal adapted to release parking braking of the vehicle body.

3. The agricultural work vehicle of claim 2, wherein the switching module switches to the release mode when it is determined that the shuttle lever has generated a neutral signal in the conjunctive operation mode.

4. The agricultural work vehicle of claim 1, wherein the conjunctive operation module controls the braking unit and the forward-reverse clutch so that, as a rotation angle of the brake pedal unit increases, the braking rate increases and the drive transmission rate decreases in the conjunctive operation mode.

5. The agricultural work vehicle of claim 1, wherein the conjunctive operation module:
when a rotation angle of the brake pedal unit changes in an increasing direction in the conjunctive operation mode, controls the braking unit and the forward-reverse clutch so that the braking rate and the drive transmission rate can be adjusted according to a braking profile in which the drive transmission rate decreases as the braking rate increases; and
when the rotation angle of the brake pedal unit changes in a decreasing direction in the conjunctive operation mode, controls the braking unit and the forward-reverse clutch so that the braking rate and the drive transmission rate can be adjusted according to a release profile in which the drive transmission rate increases as the braking rate decreases.

6. The agricultural work vehicle of claim 5, wherein the braking profile is implemented to have a smaller drive transmission rate than the release profile when the rotation angle of the brake pedal unit changes in a change section between a preset first rotation angle and a preset second rotation angle larger than the first rotation angle.

7. The agricultural work vehicle of claim 6, wherein the braking profile:
is implemented such that, when the rotation angle of the brake pedal unit changes in a braking entry section that is larger than a lowest rotation angle and smaller than the first rotation angle, an amount of change in the drive transmission rate compared to an amount of change in the braking rate is larger than when the rotation angle of the brake pedal unit changes in the change section; and
is implemented such that, when the rotation angle of the brake pedal unit changes in a braking finish section that is larger than the second rotation angle and smaller than a maximum rotation angle, an amount of change in the drive transmission rate compared to an amount of change in the braking rate is smaller than when the rotation angle of the brake pedal section changes in the change section.

8. The agricultural work vehicle of claim 6, wherein the release profile:
is implemented such that, when the rotation angle of the brake pedal unit changes in a release entry section that is smaller than a maximum rotation angle and larger than the second rotation angle, an amount of change in the drive transmission rate compared to an amount of change in the braking rate is larger than when the rotation angle of the brake pedal unit changes in the change section; and
is implemented such that, when the rotation angle of the brake pedal unit changes in a release finish section that is larger than a lowest rotation angle and smaller than the first rotation angle, an amount of change in the drive transmission rate compared to an amount of change in the braking rate is smaller than when the rotation angle of the brake pedal unit changes in the change section.

9. The agricultural work vehicle of claim 5, further comprising a rotation angle acquisition sensor configured to detect the brake pedal unit and acquire the rotation angle of the brake pedal unit.

10. The agricultural work vehicle of claim 5, further comprising a hydraulic sensor configured to measure a hydraulic pressure of a working fluid supplied to the forward-reverse clutch;
wherein the control unit further includes a correction module configured to generate a correction value adapted to correct each of the braking profile and the release profile when the hydraulic pressure of the working fluid measured by the hydraulic sensor deviates from a preset reference hydraulic pressure value in the conjunctive operation mode.

11. The agricultural work vehicle of claim 5, further comprising an oil temperature sensor configured to measure a temperature of the working fluid supplied to the forward-reverse clutch;
wherein the control unit further includes a correction module configured to generate a correction value adapted to correct each of the braking profile and the release profile when the temperature of the working fluid measured by the oil temperature sensor deviates from a preset reference temperature value in the conjunctive operation mode.

12. The agricultural work vehicle of claim 5, wherein the control unit further includes a correction module configured to correct each of the braking profile and the release profile so that the drive transmission rate selectively increases and decreases depending on a shifting stage of the transmission.

* * * * *